United States Patent [19]

Smith, Jr. et al.

[11] 4,332,500

[45] Jun. 1, 1982

[54] TIE ROD BALL JOINT CONSTRUCTION

[75] Inventors: Joseph E. Smith, Jr., Birmingham; William H. Trudeau, Brighton, both of Mich.

[73] Assignee: Gulf & Western Manufacturing Company, Southfield, Mich.

[21] Appl. No.: 16,917

[22] Filed: Mar. 2, 1979

[51] Int. Cl.³ .......................................... F16C 11/06
[52] U.S. Cl. .................................................. 403/114
[58] Field of Search ................. 403/53, 114, 121, 127, 403/135, 152, 165

[56] References Cited

U.S. PATENT DOCUMENTS 3,072,426  1/1963  Gilbert ............................ 403/165 X
3,090,642  5/1963  Gottschald et al. ............ 403/135 X

FOREIGN PATENT DOCUMENTS 452397  11/1948  Canada ............................. 403/114
602081   5/1948  United Kingdom .
818549   8/1959  United Kingdom ............... 403/114

*Primary Examiner*—Werner H. Schroeder
*Attorney, Agent, or Firm*—Barnes, Kisselle, Raisch & Choate

[57] ABSTRACT

A joint assembly having a socket member, a stud member, and restrainer elements constructed and arranged to prevent the socket and stud members from pivoting relative to each other in one plane containing the longitudinal axis of the stud member while permitting the members to pivot in a plane at a right angle to such one plane and containing such axis and permitting the stud member to rotate on such axis with respect to the socket member.

17 Claims, 31 Drawing Figures

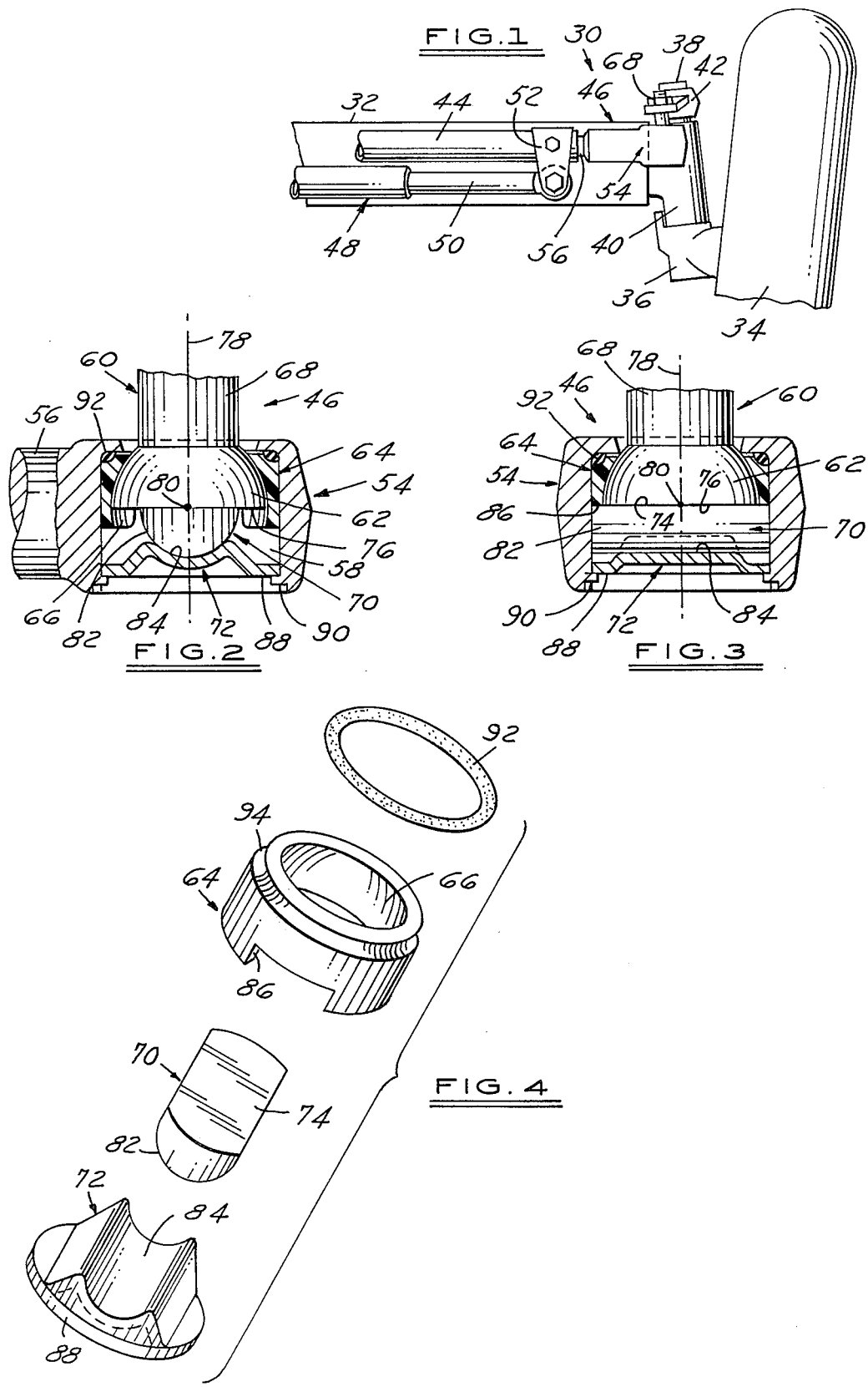

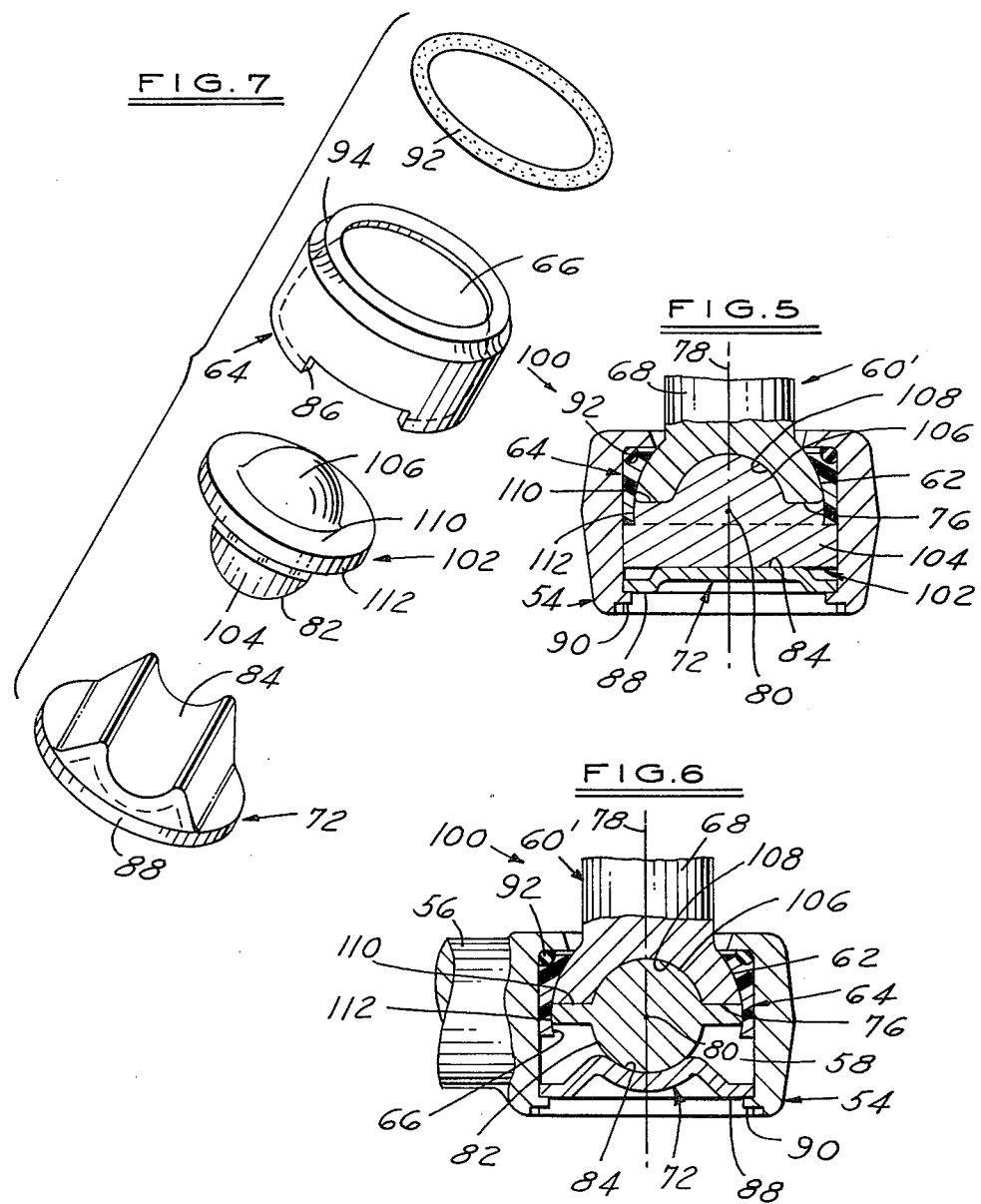

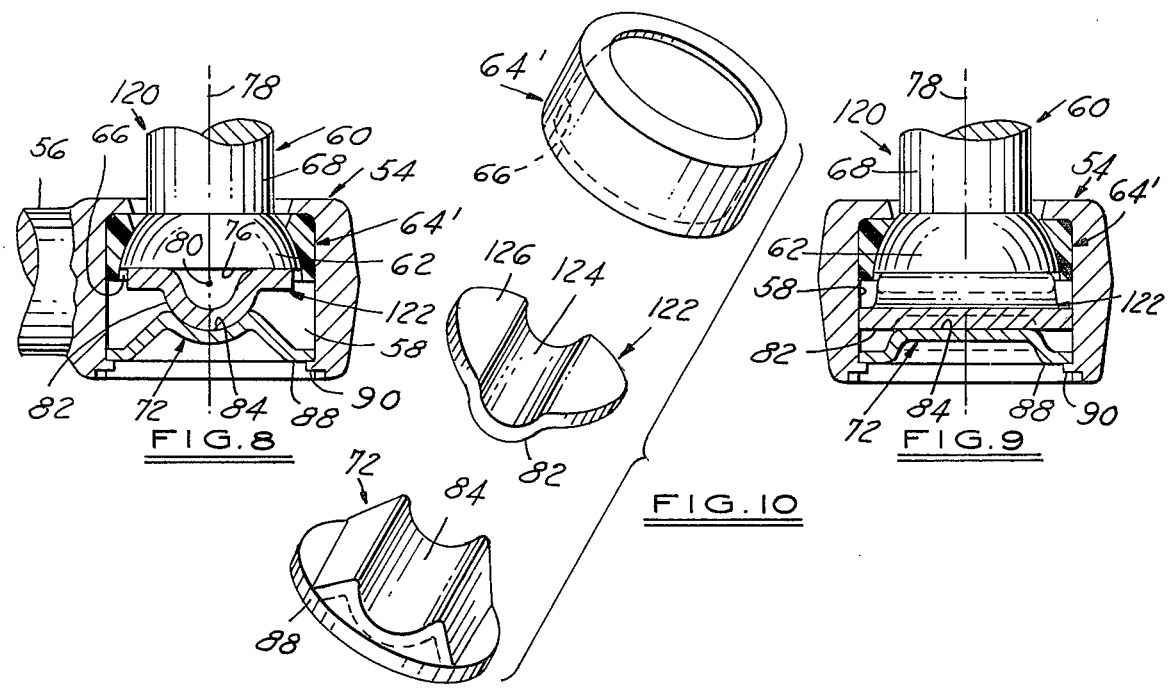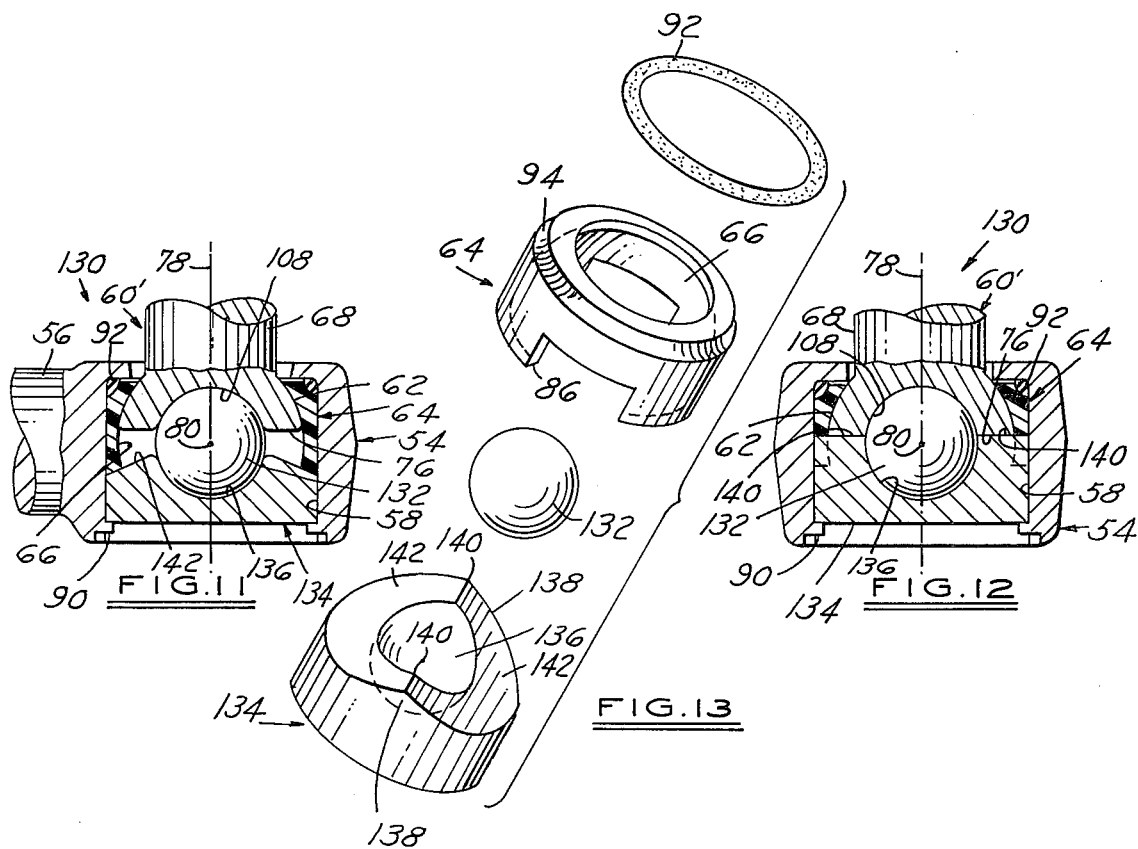

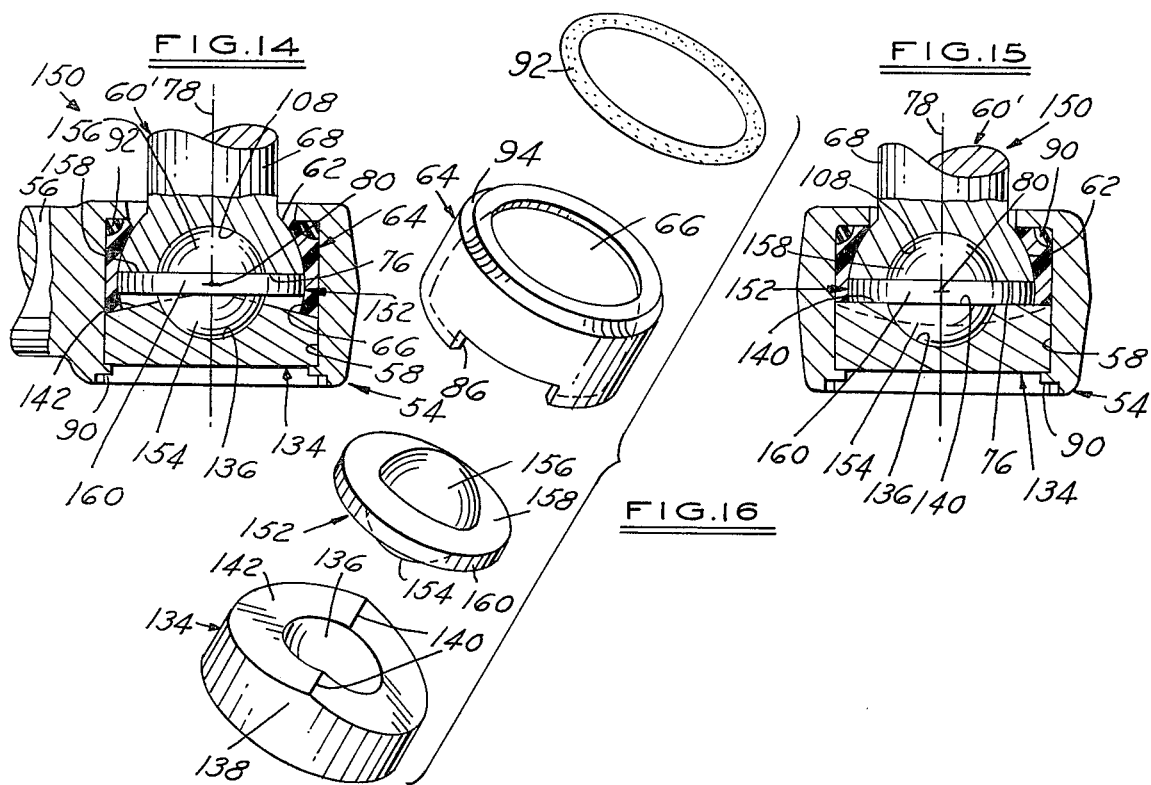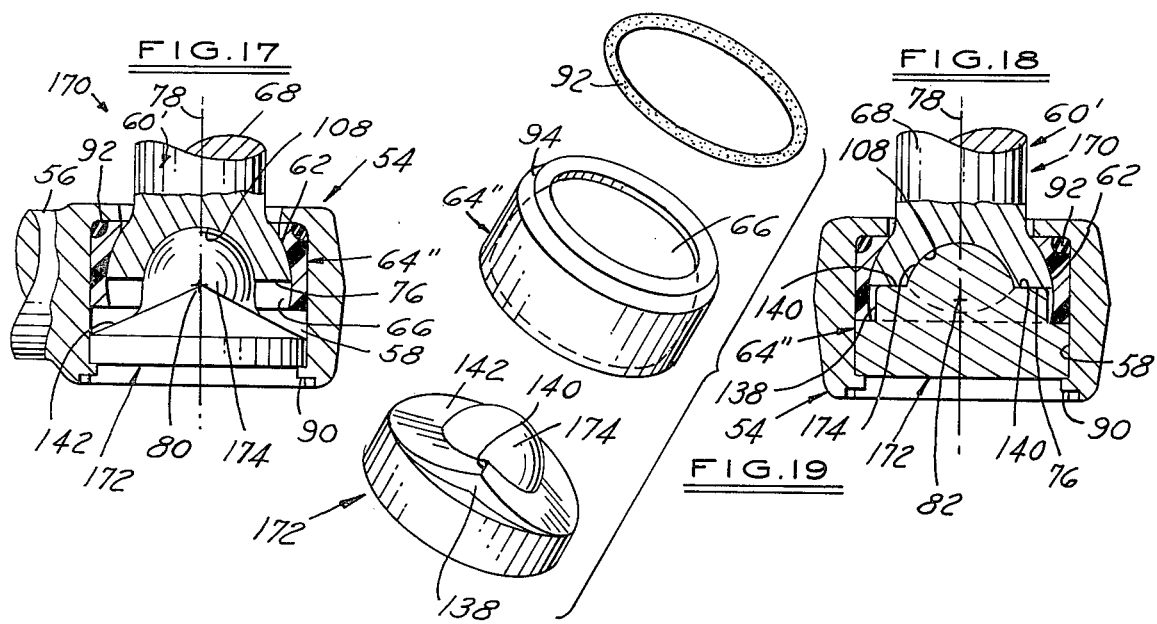

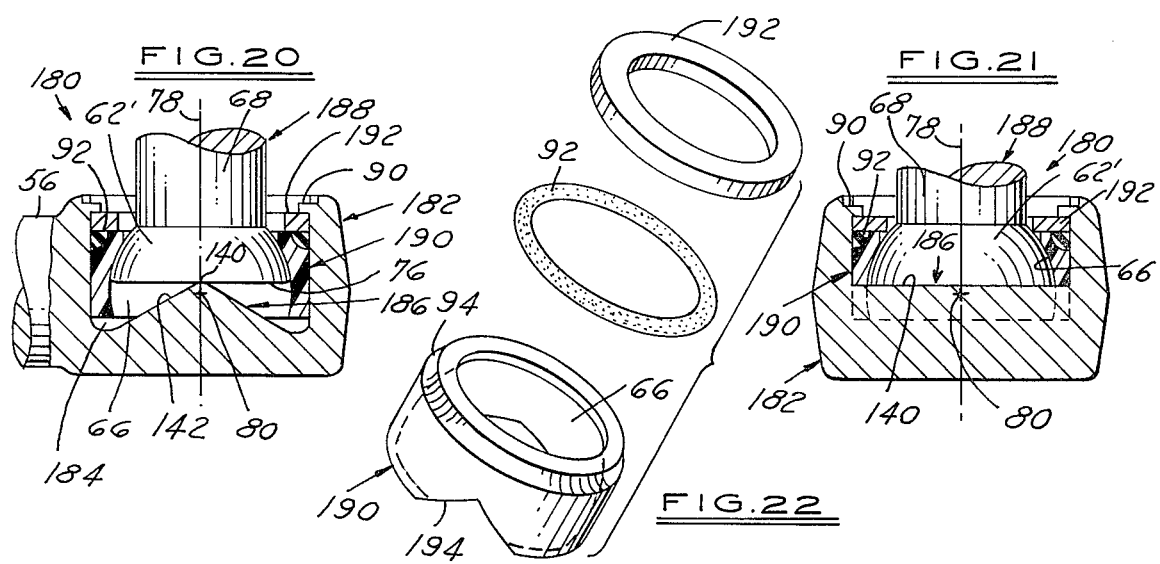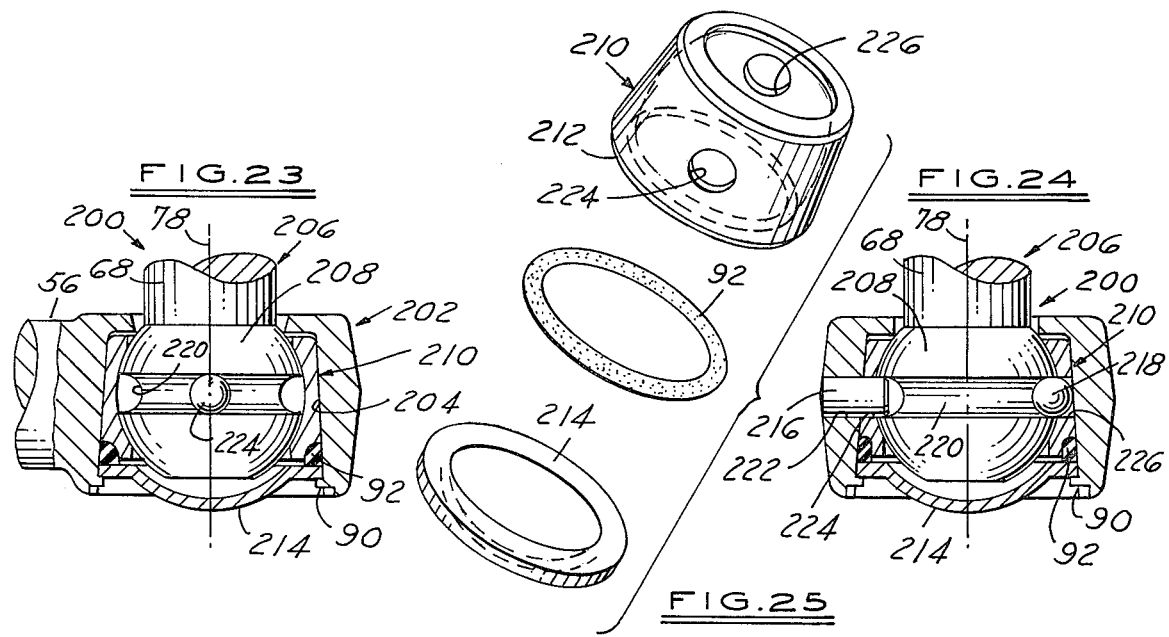

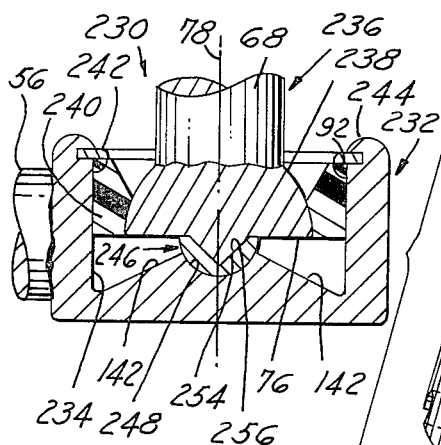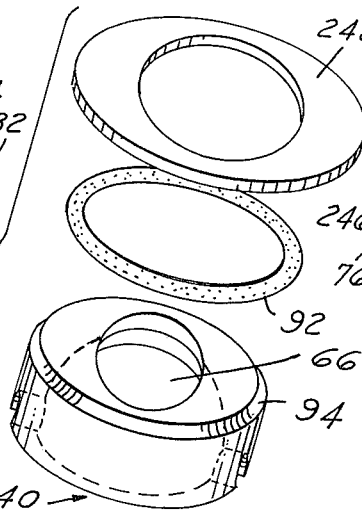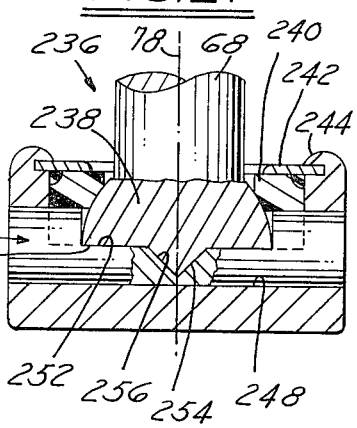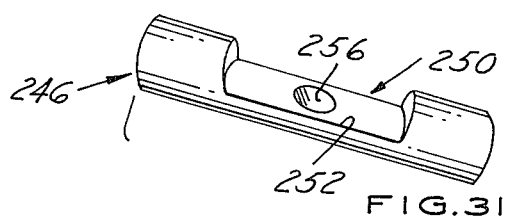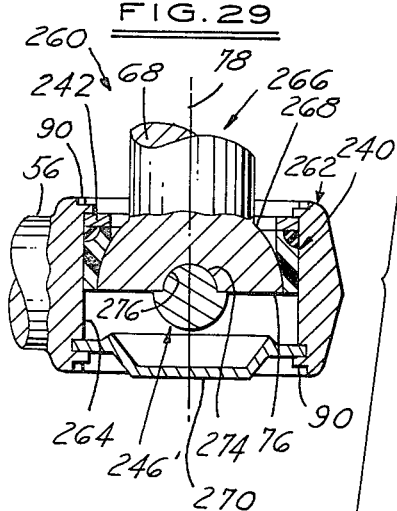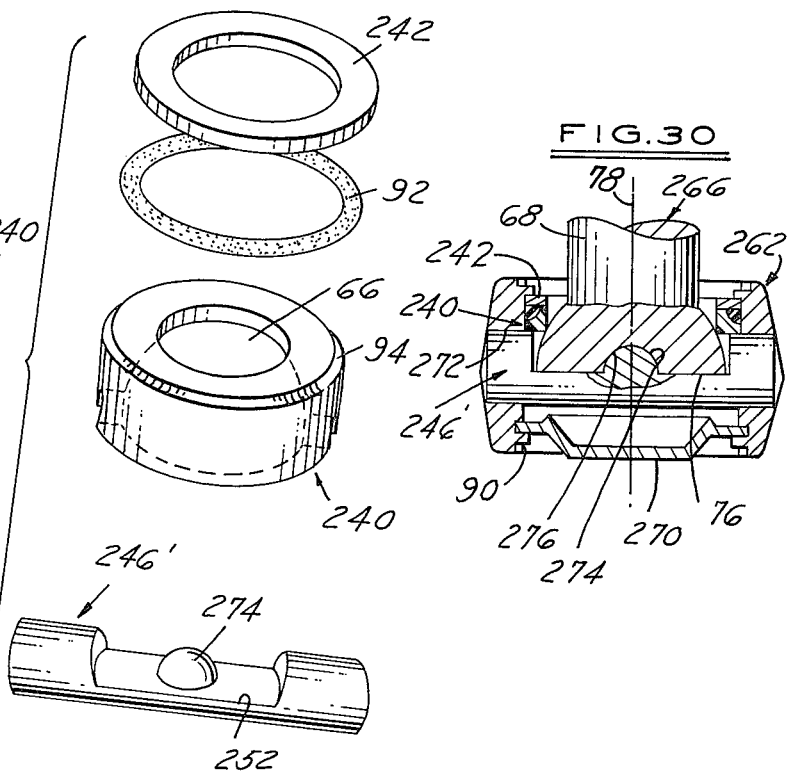

TIE ROD BALL JOINT CONSTRUCTION

This invention relates to joint constructions and more particularly to a joint construction for the steering linkage of motor vehicles and the like.

In the steering mechanism of some motor vehicles the tie rod is subjected to a torque which would rotate conventional ball joints connecting the tie rod to the steering knuckle thereby introducing undesirable lost motion and instability in the steering system. In such steering systems rotation of the tie rod can be resisted and prevented by ball joints such as those shown in Jones U.S. Pat. No. 3,527,316 issued Sept. 8, 1970, which are constructed and arranged so that the socket and ball stud members cannot be pivoted relative to each other in one plane containing the longitudinal axis of the ball stud while still permitting the members to pivot in a plane at a right angle to such one plane and containing such axis. In ball joints of the Jones patent relative pivoting or rotation in such one plane is prevented by either a slot in the socket housing which engages the stud at a point remote from the ball which is subject to considerable wear and hence has a relatively short useful life in-service or an assembly having a separate stem extending from the ball and received in a bearing slidably received in a slot in the housing which is a relatively expensive construction and requires an enlarged socket housing.

Objects, features and advantages of this invention are to provide a ball joint assembly with a socket which cannot be pivoted relative to the stud in one plane containing the axis of the stud which assembly has a compact housing, has a relatively long useful life in service, and is rugged, durable, maintenance free, of simplified design and economical manufacture and assembly.

These and other objects, features and advantages of this invention will be apparent from the following detailed description, appended claims and accompanying drawings in which:

FIG. 1 is a semischematic fragmentary view of a steering linkage utilizing a ball joint assembly embodying this invention;

FIGS. 2 and 3 are sectional views taken at a right angle to each other of the ball joint assembly of FIG. 1;

FIG. 4 is an exploded perspective view of some of the component parts of the ball joint assembly of FIG. 1;

FIGS. 5 and 6 are sectional views taken at right angles to each other of a second ball joint assembly embodying this invention;

FIG. 7 is an exploded perspective view of some of the component parts of the ball joint assembly of FIGS. 5 and 6;

FIGS. 8 and 9 are sectional views taken at right angles to each other of a third ball joint assembly embodying this invention;

FIG. 10 is a perspective view of some of the component parts of the ball joint assembly of FIGS. 8 and 9;

FIGS. 11 and 12 are sectional views taken at a right angle to each other of a fourth ball joint assembly embodying this invention;

FIG. 13 is an exploded perspective view of some of the component parts of the ball joint assembly of FIGS. 11 and 12;

FIGS. 14 and 15 are sectional views taken at a right angle to each other of a fifth ball joint assembly embodying this invention;

FIG. 16 is an exploded perspective view of some of the component parts of the ball joint assembly of FIGS. 14 and 15;

FIGS. 17 and 18 are sectional views taken at a right angle to each other of a sixth ball joint assembly embodying this invention;

FIG. 19 is an exploded perspective view of some of the component parts of the ball joint assembly of FIGS. 17 and 18;

FIGS. 20 and 21 are sectional views at a right angle to each other of a seventh ball joint assembly embodying this invention;

FIG. 22 is an exploded perspective view of some of the component parts of the ball joint assembly of FIGS. 20 and 21;

FIGS. 23 and 24 are sectional views taken at a right angle to each other of an eighth ball joint assembly embodying this invention;

FIG. 25 is an exploded perspective view of some of the component parts of the ball joint assembly of FIGS. 23 and 24;

FIGS. 26 and 27 are sectional views taken at a right angle to each other of a ninth ball joint assembly embodying this invention;

FIG. 28 is an exploded perspective view of some of the component parts of the ball joint assembly of FIGS. 26 and 27;

FIGS. 29 and 30 are sectional views taken at a right angle to each other of a tenth ball joint assembly embodying this invention; and FIG. 31 is an exploded perspective view of some of the component parts of the ball joint assembly of FIGS. 29 and 30.

Referring in more detail to the drawings FIG. 1 illustrates a steering mechanism 30 of a motor vehicle such as a tractor (not shown) having a solid front axle 32 and a wheel 34 mounted on the spindle of a steering knuckle 36 fixed to a king pin 38 journaled for rotation in a front axle extension 40. One end of a steering arm 42 is secured to king pin 38 and the other end of the arm is connected to a tie rod 44 by a ball joint assembly 46 embodying this invention. Wheel 34 is turned to steer the vehicle by force applied to the tie rod 44 by a hydraulic cylinder 48 through its piston rod 50 which is connected by a bracket 52 to the tie rod. The force applied by cylinder 48 creates a torque tending to rotate tie rod 44 on its longitudinal axis which rotation is resisted and prevented by ball joint assembly 46.

As shown in FIGS. 1 through 3 ball joint assembly 46 has a housing or socket member 54 with a mounting arm 56 retained in tie rod 44 and a generally cylindrical cavity 58 in which a ball stud member 60 is mounted. Member 60 has a semi-spherical ball segment 62 received in an annular bearing seat 64 with a complimentary bearing surface 66, and an integral shank or stud portion 68 projecting from the cavity to the exterior of the socket 54.

In accordance with this invention pivoting of socket and stud members 54 and 60 relative to each other is prevented in one plane containing the longitudinal center line of the stud member while permitting both pivoting of the members in a plane at a right angle to such one plane and containing such center line and rotation of the stud member on such center line, by a restrainer element 70 which engages the stud member and is journaled in a retainer 72. Restrainer 70 has a flat face 74 which bears on a generally flat abutment surface 76 of ball segment 62 which extends generally transverse to the axis 78 of ball stud 60 and preferably passes through the center 80 of ball segment 62.

Restrainer 70 also has a semi-spherical bearing surface 82 which bears on complimentary surface 84 of retainer 72 and has its longitudinal axis essentially coincident with the center 80 of the semi-spherical ball segment 72. In assembly the longitudinal axis of semi-cylindrical bearing surface 82 intersects the longitudinal axis 78 of stud member 60 which axes define the plane in which the socket and stud members 54 and 60 are prevented from pivoting relative to each other. To provide clearance in assembly between restrainer 70 and bearing seat 64, the seat has a pair of opposed slots 86 therethrough.

The base of retainer 72 is a generally flat disc 88 which is received in a recess in cavity 58 and retained therein by staked portions 90 of the socket member. Compensation for in-service wear between ball 62, bearing seat 64, restrainer 70, and retainer 72 is provided by a resilient ring 92 of an elastomeric material received in a groove 94 of bearing seat 64 and compressed between the seat and socket 54.

FIGS. 5 through 7 illustrate a second joint assembly 100 which is the same as joint assembly 46 except that it has a modified restrainer element 102 providing increased bearing area between the stud member 60' and the restrainer element. Restrainer 102 has a lower key portion 104 with a semi-cylindrical bearing surface 82 engaging a complimentary bearing surface 84 of retainer 72, an upper dome shaped portion with a semi-spherical bearing surface 106 engaging a complimentary semi-spherical bearing surface 108 in the ball portion of stud member 60', and an intermediate disc portion with a flat face 110 and a semi-spherical edge surface 112 which in assembly respectively bear on the abutment surface 76 of the stud member and the semi-spherical surface 66 of the bearing seat 64.

FIGS. 8 through 10 illustrate a third joint assembly 120 which is essentially the same as joint assembly 46 except that resilient ring 92 has been eliminated and wear take-up compensation is provided by a flexible restrainer element 122. In assembly restrainer 122 is displaced from its normal unstressed position to yieldably urge together the bearing seat 64', stud member 60, restrainer 122 and retainer 72. Restrainer 122 is a disc of plastic or metal such as spring steel which has a depressed central portion 124 forming bearing surface 82 and a pair of wing portions 126 which in assembly bear on the abutment face 76 of the ball of the stud member 60.

FIGS. 11 through 13 illustrate a fourth joint assembly 130 having a ball bearing 132 engaging the complimentary semi-spherical surface 108 in ball 62 of stud member 60' and received in a retainer block 134 in engagement with a complimentary semi-spherical surface 136. The centers of the ball 132 and semi-spherical surfaces 108 and 136 are concentric with each other and with the center 80 of the semi-spherical ball segment 62 of the stud member. Pivoting of socket and stud members 54 and 60' in one plane is prevented by a pair of laterally spaced apart stop portions 138 of retainer 134 which project toward the ball 62 and terminate in apexes 140 bearing on abutment surface 76 of the ball to prevent pivoting of the members in a plane containing the apexes 140 and the longitudinal axis 78 of the stud member. Preferably the extent of the pivotal movement of the members 54 and 60' in a plane containing the center line 78 of the stud member and the longitudinal center line of the arm 56 of the socket is limited by engagement of abutment surface 76 with a portion of the faces 142 of the retainer 134.

FIGS. 14 through 16 illustrate a fifth joint assembly 150 similar to joint assembly 130 except that it has a modified restrainer element 152 providing greater bearing surface area between the ball of stud member 60' and the restrainer. Restrainer 152 has a lower portion with a semi-spherical bearing surface 154 in mating engagement with the semi-spherical surface 136 of retainer 134, an upper portion with a semi-spherical surface 156 complimentary to and bearing on the semi-spherical surface 108 in the ball of stud member 60', and a central disc portion with a generally flat face 158 and a semi-spherical edge surface 160 which is assembly respectively engage abutment surface 76 of the stud member 60' and surface 66 of the bearing seat 64. Restrainer 152 may be made of plastic or metal, the center of its semi-spherical surface 154 is concentric with the center 80 of the semi-spherical exterior surface of the ball segment 62, and the center of its semi-spherical surface 156 lies on the axis 78 of the stud member 60'.

FIGS. 17 through 19 illustrate a sixth joint assembly 170 which is the same as joint assembly 130 except that it has a one-piece restrainer and retainer 172 of plastic or metal with an integral central portion providing a semi-spherical bearing surface 174 complimentary to and engaging bearing surface 108 in the ball of stud member 60'.

FIGS. 20 through 22 illustrate a seventh joint assembly 180 with a socket 182 having a blind cavity 184 with an integral restrainer 186 formed in the bottom thereof with tapered walls 142 terminating in a knife edge or apex 140. The stud member 188 has a ball segment 62' received in a bearing seat 190 which is retained in cavity 184 by a metal retainer ring 192 and staked portions 90 of the socket. To provide clearance for the restrainer 186 the bearing seat 190 has a pair of slots 194 therethrough. To provide wear take-up compensation bearing seat 190, ball segment 62' and apex 140 of restrainer 186 are yieldably urged together by a resilient ring 92. The apex 140 of integral restrainer 186 both supports stud member 188 and prevents the socket and stud members 182 and 188 from pivoting relative to each other in a plane containing both the apex 140 and the axis 78 of the stud member.

FIGS. 23 through 25 illustrate an eighth joint assembly 200 with a socket member 202 having a cavity with a generally tapered circular side wall 204 and a ball stud member 206 with a ball 208 received in a bearing seat 210. To provide compensation for in-service wear bearing seat 210 is urged into engagement with ball 208 by the cooperation of tapered wall 204 and ring 92 of an elastomeric material received in a groove 212 in the bearing seat and compressed by a closure cap 214 retained in the cavity by staked portions 90 of the socket.

The socket and stud members 202 and 206 are prevented from pivoting relative to each other in one plane by the cooperation of a pin 216 and a ball bearing 218 with a circumferentially continuous groove 220 in the equatorial region of the ball. Pin 216 is pressed into a hole 222 in the socket, passes through a clearance hole 224 in the bearing seat, and extends into the groove. Ball bearing 218 is received in a hole 226 in the bearing seat and extends into the groove. In use of joint assembly 200 the pin 216 and ball 218 in cooperation with groove 220 prevent pivoting of the socket and stud members 202 and 206 in a plane defined by the longitudinal axis of the pin and the longitudinal axis of the stud member while permitting the stud member to rotate on its longitudinal axis 78.

FIGS. 26 through 28 illustrate a ninth joint assembly 230 with a socket member 232 having a blind cavity 234 and a ball stud member 236 with a semi-spherical ball segment 238 received in a bearing seat 240. To provide compensation for in-service wear bearing seat 240 is urged into engagement with ball 238 by a ring 92 of an elastomeric material received in a groove 94. Bearing seat 240 is retained in cavity 234 by a retainer ring 242 and spun over portions 244 of the socket.

The socket and stud members 232 and 236 are prevented from pivoting relative to each other in one plane by a restrainer pin 246 received for rotation on its longitudinal axis in a bore 248 through the socket and having therein a pocket 250 with a generally flat face 252 which bears on a generally flat abutment surface 76 of the ball segment 238. The ball 238 is located in the pocket of pin 246 and the bearing area between the ball and the pin is increased by a conical projection 254 on the bottom of the ball which is coincident with the axis 78 of the stud member and extends into and bears on a mating conical recess 256 in the pin 246. The extent of the pivotal movement of the socket and stud members 232 and 236 in a plane perpendicular to the longitudinal center line of the restrainer pin 246 and containing the center line 78 of the stud member is limited by engagement of abutment surface 76 with faces 142 of the tapered bottom wall of the cavity 234 of the socket member.

FIGS. 29 through 31 illustrate a tenth joint assembly 260 with a socket member 262 having a generally cylindrical through cavity 264 and a ball stud member 266 with a semi-spherical ball segment 268 received in bearing seat 240 which is retained in the cavity by retainer ring 242 and staked portions 90 of the socket member. A cover 270 is received in a recess on the lower end of cavity 264 and is retained therein by staked portions 90 of the socket member.

The socket and stud members 262 and 266 are prevented from pivoting relative to each other in one plane by a restrainer pin 246' received for rotation on its longitudinal axis in coaxial holes 272 in the socket member, extending transversely across the cavity, and having a pocket with a flat face 252 bearing on abutment surface 76 of the stud member. The ball 268 of the stud member is located in the pocket of the restrainer pin 246' and the bearing area between the pin and the ball is increased by a semi-spherical projection 274 on the pin which engages with a mating semi-spherical pocket 276 in the bottom of the ball. Unlike joint assembly 230 in joint assembly 260 the central portion of the restrainer pin is unsupported by the socket member.

In ball joint assemblies embodying this invention, preferably the socket is a forging of steel, the ball stud member is of steel, the bearing seats, restrainers, and retainers are of metal or plastic, and the wear take-up ring is of an elastomeric material but may be a sinuous ring of spring steel. When each joint assembly is in use the socket and stud members cannot be pivoted relative to each other in one plane containing the axis of the stud member while they can be pivoted relative to each other in a plane at a right angle to such one plane and containing such axis and the stud member can rotate on its longitudinal axis relative to the socket member, thereby providing a suitable joint assembly for steering linkages requiring ball joints which prevent rotation of the tie rods to which they are connected. Each of the ball joints is of relatively simple and compact design, rugged and durable construction, may be economically manufactured and assembled, and is compensated for inservice wear of the moving parts to provide a long in-service useful life.

We claim:

1. A joint comprising a socket member having a cavity therein opening to the exterior thereof, a stud member having a ball portion received in said cavity and a stud projecting generally axially therefrom to the exterior of said socket member, said ball having a semi-spherical bearing surface, an abutment means on said ball portion in the equatorial area of said semispherical bearing surface, a bearing seat ring received in said cavity and having a semi-spherical surface complimentary to and bearing on at least a portion of said semi-spherical surface of said ball, and a restraining pin disposed in said cavity, journaled for rotation in said socket member, and constructed and arranged to bear on said abutment means to essentially prevent pivoting of said members relative to each other in one plane containing the longitudinal axis of said stud member while permitting pivoting of said members relative to each other in a plane at a right angle to said one plane and containing said longitudinal axis of said stud member and permitting said stud member and ball portion to rotate in unison on its longitudinal axis relative to said socket member.

2. The joint of claim 1 wherein said abutment means comprises a generally flat surface extending generally transversely to the longitudinal axis of said stud.

3. A joint comprising a socket member having a cavity therein opening to the exterior thereof, a stud member having a ball received in said cavity and a stud projecting generally axially therefrom to the exterior of said socket member, said ball having a semi-spherical bearing surface, an abutment means on said ball in the equatorial area of said semi-spherical surface, a bearing seat ring received in said cavity and having a semi-spherical surface complimentary to and bearing on at least a portion of said semi-spherical surface of said ball, a retainer disposed in said cavity below said stud member and having a generally semi-cylindrical bearing surface with its axis essentially lying on the center of the semi-spherical bearing surface of said ball, a restrainer disposed in said cavity between said retainer and said stud member, having a generally semi-cylindrical bearing surface complimentary to and engaging said semi-cylindrical bearing surface of said retainer, and constructed and arranged to bear on said abutment means to essentially prevent pivoting of said members relative to each other in one plane containing the longitudinal axis of said stud member while permitting pivoting of said members relative to each other in a plane at a right angle to said one plane and containing said longitudinal axis of said stud member and permitting said ball and stud member to rotate in unison on its longitudinal axis relative to said socket member, and stop members carried by said retainer and constructed and arranged to bear on said abutment means on said ball to limit the extent of pivoting of said members relative to each other in said plane at a right angle to said one plane.

4. A joint comprising a socket member having a cavity therein opening to the exterior thereof, a stud member having a ball received in said cavity and a stud projecting generally axially therefrom to the exterior of said socket member, said ball having a semi-spherical bearing surface, an abutment means on said ball in the equatorial area of said semi-spherical surface, a bearing seat ring received in said cavity and having a semi-spherical surface complimentary to and bearing on at least a portion of said semi-spherical surface of said ball, a retainer disposed in said cavity below said stud member and having a generally semi-cylindrical bearing surface with its axis essentially lying in said one plane and essentially on the center of the semi-spherical bearing surface of said ball, a restrainer disposed in said cavity between said retainer and said stud member, having a generally semi-cylindrical bearing surface complimentary to and engaging said semi-cylindrical bearing surface of said retainer, and contructed and arranged to bear on said abutment means to essentially prevent pivoting of said members relative to each other in one plane containing the longitudinal axis of said stud member while permitting pivoting of said members relative to each other in a plane at a right angle to said one plane and containing said longitudinal axis of said stud member and permitting said ball and stud member to rotate in unison on its longitudinal axis relative to said socket member, and a bearing operatively associated with said restrainer and said ball and constructed and arranged to maintain the axis of said semi-cylindrical bearing surface of said restrainer essentially on the center of said semi-spherical bearing surface of said ball of said stud member while permitting said stud member to rotate on its axis relative to said restrainer and having a generally dome shaped bearing surface with its center essentially coincident with the center of said semi-spherical bearing surface of said ball of said stud member.

5. The joint of claim 4 which also comprises means yieldably urging together said bearing seat, ball, restrainer, and retainer so as to provide a joint with wear take-up compensation.

6. The joint of claim 4 wherein said abutment means of said ball comprises a generally flat planar surface extending generally transversely of the longitudinal axis of said ball stud member and said restrainer has at least one generally flat surface engaging said flat surface of said abutment means.

7. The joint of claim 4 wherein said restrainer is constructed and arranged to yieldably urge together said bearing seat, ball of said stud member, restrainer, and retainer so as to provide a joint with in-service wear take-up compensation.

8. A joint comprising a socket member having a cavity therein opening to the exterior thereof, a stud member having a ball received in said cavity and a stud projecting generally axially therefrom to the exterior of said socket member, said ball having a semi-spherical bearing surface, an abutment means on said ball in the equatorial area of said semi-spherical surface, a bearing seat ring received in said cavity and having a semi-spherical surface complimentary to and bearing on at least a portion of said semi-spherical surface of said ball, a retainer disposed in said cavity below said stud member and having a generally semi-cylindrical bearing surface with its axis essentially lying in said one plane and essentially on the center of the semi-spherical bearing surface of said ball, and a restrainer disposed in said cavity between said retainer and said stud member, having a first generally semi-cylindrical bearing surface complimentary to and engaging said semi-cylindrical bearing surface of said retainer, and constructed and arranged to bear on said abutment means to essentially prevent pivoting of said members relative to each other in one plane containing the longitudinal axis of said stud member while permitting pivoting of said members relative to each other in a plane at a right angle to said one plane and containing said longitudinal axis of said stud member and permitting said ball and stud member to rotate in unison on its longitudinal axis relative to said socket member, and said restrainer also has a second generally semi-spherical bearing surface constructed and arranged to be complimentary to and engage a portion of said semi-spherical bearing surface of said bearing seat.

9. A joint comprising a socket member having a cavity therein opening to the exterior thereof, a stud member having a ball portion received in said cavity and a stud projecting generally axially therefrom to the exterior of said socket member, said ball having a semi-spherical bearing surface, an abutment means on said ball portion in the equatorial area of said semi-spherical bearing surface and within the radius of said semi-spherical bearing surface, a bearing seat ring received in said cavity and having a semi-spherical surface complimentary to and bearing on at least a portion of said semi-spherical surface of said ball, restraining means disposed in said cavity and constructed and arranged to bear on said abutment means to essentially prevent pivoting of said members relative to each other in one plane containing the longitudinal axis of said stud member while permitting pivoting of said members relative to each other in a plane at a right angle to said one plane and containing said longitudinal axis of said stud member and permitting said stud member and ball portion to rotate in unison on its longitudinal axis relative to said socket member and restraining means also has a stop member received in said cavity below said ball of said stud member and having portions projecting toward said stud member and each terminating in an apex underlying said abutment means of said ball, extending generally transversely of the longitudinal axis of said stud member, and lying essentially in said one plane.

10. The joint of claim 9 which also comprises an essentially spherical bearing interposed between said stop member and said ball of said stud member and constructed and arranged to bear on complimentary semi-spherical surfaces in said stop member and in said ball of said stud member with its center essentially coincident with the center of said semi-spherical bearing surface of said ball of said stud member.

11. The joint of claim 9 wherein said stop member also comprises a semi-spherical bearing surface constructed and arranged to be complimentary to and engage a semi-spherical surface in said ball of said stud member with its center essentially coincident with said semi-spherical bearing surface of said ball of said stud.

12. The joint of claim 9 which also comprises means yieldably urging said bearing seat, ball of said stud member, and stop member together so as to provide a joint with in-service wear take-up compensation.

13. A joint comprising a socket member having a cavity therein opening to the exterior thereof, a stud member having a ball portion received in said cavity and a stud projecting generally axially therefrom to the exterior of said socket member, said ball having a semi-spherical bearing surface, an abutment means on said ball portion in the equatorial area of said semi-spherical bearing surface and within the radius of said semi-spherical bearing surface, a bearing seat ring received in said cavity and having a semi-spherical surface complimentary to and bearing on at least a portion of said semi-spherical surface of said ball, restraining means disposed in said cavity and constructed and arranged to bear on said abutment means to essentially prevent pivoting of said members relative to each other in one plane containing the longitudinal axis of said stud member while permitting pivoting of said members relative to each other in a plane at a right angle to said one plane and containing said longitudinal axis of said stud member and permitting said stud member and ball portion to rotate in unison on its longitudinal axis relative to said socket member, a stop member disposed in said cavity under said ball of said stud member and having a pair of laterally spaced apart stops projecting toward said stud member and each terminating in an apex spaced from said abutment means of said ball, extending generally transversely of the longitudinal axis of said stud member, and lying essentially in said one plane, and a bearing element disposed in said cavity between said stop member and said stud member and having generally opposed first and second bearing portions respectively engaging said ball and said stop member and a peripheral disc portion with a pair of opposed faces and an outer edge with a generally semi-spherical surface complimentary to and engaging a portion of said semi-spherical surface of said bearing seat, at least a portion of one of said faces of said disc portion bearing on said abutment means of said ball of said stud member, and at least a portion of the other of said faces of said disc portion bearing on said apexes of said stop member.

14. The joint of claim 13 which also comprises means yieldably urging together said bearing seat, ball, bearing element, and stop member so as to provide a joint with in-service wear take-up compensation.

15. The joint of claim 13 wherein each of said first and second bearing portions of said bearing element is essentially dome shaped with its center generally concentric with the center of said semi-spherical bearing surface of said ball of said stud member.

16. A joint comprising a socket member having a cavity therein opening to the exterior thereof, a stud member having a ball portion received in said cavity and a stud projecting generally axially therefrom to the exterior of said socket member, said ball having a semi-spherical bearing surface, an abutment means on said ball portion in the equatorial area of said semi-spherical bearing surface and within the radius of said semi-spherical bearing surface, a bearing seat ring received in said cavity and having a semi-spherical surface complimentary to and bearing on at least a portion of said semi-spherical surface of said ball, restraining means disposed in said cavity and constructed and arranged to bear on said abutment means to essentially prevent pivoting of said members relative to each other in one plane containing the longitudinal axis of said stud member while permitting pivoting of said members relative to each other in a plane at a right angle to said one plane and containing said longitudinal axis of said stud member and permitting said stud member and ball portion to rotate in unison on its longitudinal axis relative to said socket member, and said restraining means also has a stop member disposed in said cavity below said ball of said stud member and having a projection terminating in an apex bearing on said abutment means of said ball, extending generally transversely of the longitudinal axis of said stud member and lying essentially in said one plane.

17. The joint of claim 16 wherein said stop member is integral with said socket member.

* * * * *